April 14, 1970 R. P. DIXON 3,506,924
F.S.K. ZERO CROSSING DETECTOR
Filed April 24, 1967
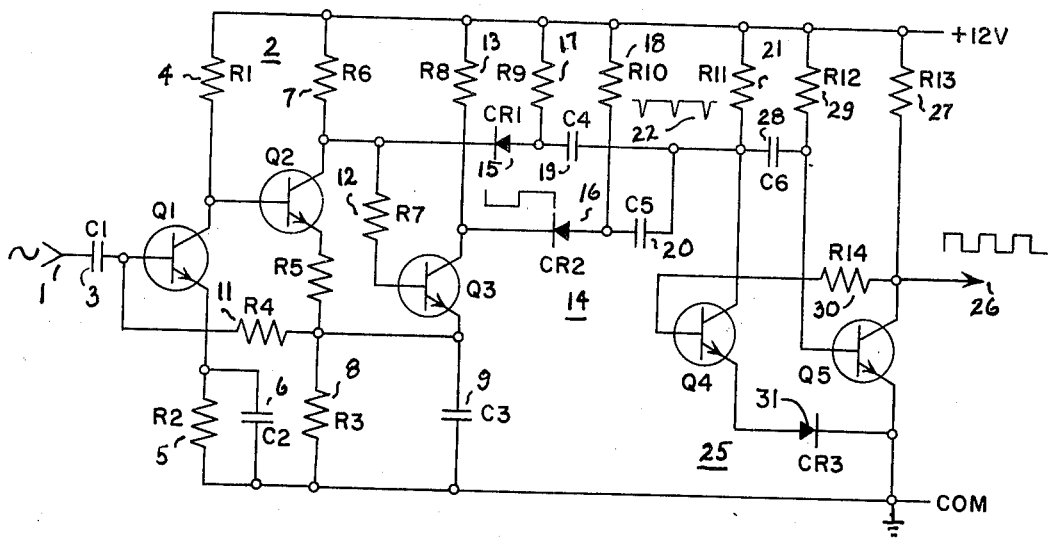
INVENTOR:
ROBERT P. DIXON,
BY *David Blumenfeld*
HIS ATTORNEY.

United States Patent Office 3,506,924
Patented Apr. 14, 1970

3,506,924
F.S.K. ZERO CROSSING DETECTOR
Robert P. Dixon, Rustburg, Va., assignor to General Electric Company, a corporation of New York
Filed Apr. 24, 1967, Ser. No. 633,205
Int. Cl. H03k 9/00
U.S. Cl. 329—104                6 Claims

ABSTRACT OF THE DISCLOSURE

A zero crossing detector for a frequency-shift-keyed carrier signal. The frequency-shifted carrier signal is applied to a pulse-shaping network in which the carrier signal is converted to two out-of-phase square waves. The square waves are rectified and differentiated to produce a pulse train with each pulse representing a zero crossing of the carrier signal. The pulses trigger a one-shot multivibrator to produce a plus train the duty cycle of which varies as the carrier frequency shifts between the two values. The pulse train from the one-shot multivibrator is applied to an integrating network, such as a low pass filter network having a cut-off below the lowest carrier frequency, to produce a DC output signal, the amplitude of which varies with the duty cycle of the applied pulse train and, hence, with the frequency shift of the carrier signal.

This invention relates to a receiver for a frequency-shift-keyed carrier signal and, more particularly, to a detector for a frequency-shift-keyed carrier in which the zero crossings of the wave are sensed to extract the intelligence.

In transmitting intelligence over a communication medium such as a telephone line, cable, or through free space, it is customary to modulate a carrier wave with the intelligence in order to vary some parameter of the carrier such as amplitude, frequency, phase, etc. When intelligence which varies between two discrete values only, as is the case when digital data which assumes the value of binary "1" and "0" is to be transmitted, the carrier wave can be modulated by shifting its frequency between two discrete values with the two discrete frequencies then representing the two discrete conditions of the intelligence. Such a modulation system is well known in the art as "frequency-shift-keying" and, in the case of transmitting binary data, frequency-shift keying of a carrier wave has been found to be particularly advantageous.

In receiving such a frequency-shift-keyed carrier wave, the intelligence can be reconstituted in its original form by sensing or detecting the shift of the carrier wave between the two frequencies representing the intelligence. Thus, for example, frequency can be sensed directly by using a discriminator or the like in which a signal is generated proportional to frequency and utilized to reconstitute the original intelligence. However, in the detecting or demodulating the frequency-shift-keyed carrier wave, it is often preferable, from the standpoint of cost, simplicity, and efficiency, not to measure the frequency directly, but to do so by measuring the zero crossings of the signal per unit time and producing a signal proportional to the number of these crossings per unit time. This has advantages in that the equipment may be simpler and less expensive, and the use of frequency-sensitive elements such as tuned circuits, crystals, etc. may be avoided. Furthermore, it is possible to eliminate expensive components such as inductors and transformers. By eliminating transformers or other inductive devices, fabrication of the circuitry in integrated circuit form is made possible with the attendant advantages in size reduction, enhanced reliability, cost, since resistive, capacitive and active components may be easily fabricated in integrated circuit form, whereas inductive and transformer devices are yet not easily fabricated by the techniques.

It is, therefore, a primary object of this invention to provide a detector for a frequency-shift-keyed carrier signal which detects the zero crossings of the carrier signal.

It is a further object of this invention to provide a detector for a frequency-shift-keyed carrier wave in which binary data represented by the frequency shift is detected by sensing the zero crossings per unit time.

Still another object of this invention is to provide a zero crossing detector for a frequency-shift-keyed carrier wave in which no inductive or transformer devices are utilized;

Yet another objective of the invention is to provide a zero crossing detector for a frequency-shift-keyed device which is particularly applicable to embodiment in integrated circuit form by the elimination of inductive or transformer devices;

Other objects and advantages will become apparent as the description thereof proceeds.

The various objectives and advantages of the instant invention are achieved by providing a zero crossing detector in which the frequency-shift-keyed carrier wave is applied to a pulse shaping network in which the sinusoidal carrier wave is converted to two out-of-phase square wave trains. The square waves are differentiated and a short negative pulse is produced for each of the negative-going pulse transitions of the square wave. These negative triggering pulses are utilized to trigger a one-shot multivibrator which thus produces an output pulse train, the duty cycle of which is a function of the repetition frequency of the pulse train and, hence, of the frequency of the carrier wave. The pulse train is applied to an integrating circuit, which may be a low pass filter, for example, which produces an output signal the amplitude of which is a function of the duty cycle of the pulse train from the one-shot multivibrator. The output of the integrator is the time integral of the power delivered over a given period of time so that the amplitude of the output signal from the integrator is proportional to the frequency of the carrier. This control signal may then be utilized directly if desired, or may be shaped further to reconstitute the binary "1's" and "0's" represented by the frequencies of the carrier wave.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing in which:

The sole figure represents a schematic diagram of the frequency shift key detector constructed in accordance with the invention.

The sole figure of the drawing shows a zero crossing detector for a frequency-shift-keyed carrier wave which utilizes no inductive or transformer devices, and which produces an output signal which is proportional to the number of the zero crossings of the carrier wave in a given interval of time which, in turn, is directly related to the frequency of the carrier wave. The frequency-shifted carrier wave is impressed on an input terminal 1, and will vary selectively between two frequencies $f_1$ and $f_2$ for a fixed interval of time with the frequencies $f_1$ and $f_2$ representing the intelligence being transmitted, in this case respectively the binary digits "1" and "0." The frequency-shifted carrier signal is first applied to a pulse-forming network shown generally at 2 in which the carrier wave is converted to a pair of out-of-phase square-wave trains which may be further processed to detect the number of zero crossings. The pulse shaper consists of a pair of amplifier-limiters $Q_1$ and $Q_2$, in which the positive and negative alternations of the sinusoidal frequency-shifted input carrier signals are limited and shaped to produce the square wave signal. $Q_1$ and $Q_2$ are NPN transistors, each having base, collector and emitter electrodes. The base of transistor Q is connected through a coupling capacitor 3 to the input terminal and the collector is connected through a resistor 4 to the positive terminal of a source of supply voltage. The emitter, in turn, is connected through emitter-resistor 5, which is bypassed for AC by capacitor 6 to ground potential. The base of transistor $Q_2$ is connected directly to the collector $Q_1$ and the collector $Q_2$ is connected through a resistor 7 to the positive terminal supply source while the emitter is connected through resistor 8, which is bypassed for AC by capacitor 9, to ground potential. The DC-biasing conditions of transistor $Q_1$ and $Q_2$ are such that $Q_1$ saturates during the positive alternation of the sinusoidal input carrier signal, thereby clipping the positive alternation. $Q_2$, on the other hand, due to the phase-inversion produced by transistor $Q_1$, clips the negative excursion of the sinusoidal carrier at input terminal 1 so that the output at the collector of transistor $Q_2$ is substantially a square-wave signal having the same repetition frequency as the input signal with each zero crossing of the square wave representing a zero crossing of the original frequency-shifted carrier wave.

A DC feedback path between the emitter of limiter-amplifier $Q_2$ and the base of limiter amplifier $Q_1$ is provided by resistor 11 connected between the junction of emitter-resistor 8 in the emitter circuit of $Q_2$ and the base of transistor $Q_1$. This feedback path stabilizes the limiter-amplifier $Q_1$ and $Q_2$, against variations due to supply source variations or changes in DC current due to temperature changes.

The square wave at the collector of limiter-amplifier $Q_2$ is applied through a resistor 12 to the base of a phase-inverting NPN transistor-amplifier $Q_3$. Transistor $Q_3$ has a collector connected through resistor 13 to the positive terminal of the supply voltage and an emitter connected to the emitter of limiter-amplifier $Q_2$. The square wave from the collector of $Q_2$ is inverted by transistor $Q_3$ and a square wave which is out of phase with the square wave at the collector $Q_2$ appears at the collector of transistor $Q_3$.

By connecting the emitter of $Q_3$ to the emitter of $Q_2$, proper operation of the two devices is ensured. When $Q_2$ is driven into limiting to produce the negative half of the square wave, it saturates and the voltage at its collector is essentially at the same voltage as its emitter since the emitter-collector voltage drop is quite low. The base and emitter of $Q_1$ are now at the same potential and $Q_3$ is cut off. When $Q_2$ is driven to cut-off, its collector voltage rises to approximately B+ driving $Q_3$ into saturation. By virtue of this interconnection, a snap-action effect is achieved to ensure that two-out-of-phase square waves are produced at respective collectors of $Q_2$ and $Q_3$.

The two out-of-phase square waves at the collectors of transistors $Q_2$ and $Q_3$ are differentiated in a network generally illustrated at 14 to produce a negative triggering pulses for each negative-going transition of the square waves, thereby producing a train of negative triggering pulses in response to each zero crossing of the input carrier signal appearing at terminal 1. Network 14 consists of a pair of diodes 15 and 16 connected respectively to the collectors of $Q_2$ and $Q_3$. These diodes are so poled as to pass only the negative alternations of the square wave. To this end, the anodes of the diode are connected through resistors 17 and 18 to the B+ terminal of the supply voltage and their cathodes are connected respectively to the collectors of $Q_2$ and $Q_3$. It will be seen, therefore, that only during the negative alternation of the square wave when the collectors are at a low potential is the cathode of the diode sufficiently negative with respect to the anode for the signal to be passed. The negative alternations of the square wave pulse trains from the collectors of $Q_2$ and $Q_3$ are applied to a differentiating circuit consisting of the capacitors 19 and 20 connected respectively to the diodes 15 and 16, and the common differentiating resistor 21 connected between the junction and the positive terminal of the B+ supply voltage. Capacitors 19 and 20 in conjunction with resistor 21 differentiate the negative-going edges of the square wave pulse trains from the collectors of $Q_2$ and $Q_3$ to produce a train of negative-going triggering pulses shown generally at 22 with this pulse train having a repetition frequency equal to twice the frequency of the carrier wave at the input terminal 1. It will also be seen that each one of these triggering pulses represents a zero crossing of the original carrier wave, since a sinusoidal wave has two zero crossings during each cycle.

The triggering pulses 22 are applied to a monstable or "one-shot" multivibrator shown generally at 25 to produce a pulse train at the output terminal 26, the duty cycle of which varies as a function of the repetition rate of the triggering pulses and, hence, of the frequency of the frequency-shifted carrier wave at input terminal 1. Monostable multivibrators, as is well known, are characterized by the fact that they have a single stable state with one of the devices conducting, and the other in the non-conducting state. The multivibrator remains in this condition until the appearance of an input triggering pulse of the proper polarity which reverses the conducting state of the devices. The multivibrator remains in this unstable state for a fixed period of time determined by the time-constant of the multivibrator and then returns to its original stable state and remains there until the appearance of the next triggering pulse. Thus, the duration of the output pulse from one of the devices during the unstable interval and the duty cycle of the multivibrator and of the output pulse train then depends on the interval that the multivibrator remains in its normal or stable state. In other words, the repetition frequency of the triggering pulses determines the interval of time after the multivibrator has returned to its stable state before its condition is again reversed. Thus, the energy to be delivered by the one-shot multivibrator to the integrating circuit, not shown, depends on the repetition rate of the input triggering pulses and the output from the integrating circuit will have a level depending on the duty cycle of the square wave pulses, and hence, on the frequency of the carrier signal appearing at the input terminal 1.

"One-shot" multivibrator 25 consists of a pair of NPN transistors $Q_4$ and $Q_5$, which are so interconnected that $Q_5$ is normally in the conducting state and $Q_4$ in the non-conducting state until the appearance of a negative triggering pulse which reverses their conducting states for a fixed period of time after which they revert to their original state until the appearance of the next triggering pulse. Transistor $Q_5$ has a base, a collector, and an emitter, with the emitter connected directly to ground, and the collector connected through a resistor 27 to the positive terminal of the supply voltage. The base is connected through a coupling capacitor 28 to the junction of differentiating resistor 21 and the collector of $Q_4$. The base of $Q_5$ is also connected through a resistor 29 to the positive terminals of the B+ supply. Since the base is connected to B+ through the resistor and the emitter is connected directly to ground, the base-emitter junction is forward-biased and $Q_5$ is in the conducting state. A feedback path between the collector of $Q_5$ and the base of transistor $Q_4$ is established through feedback resistor 30, thereby maintaining the base of NPN transistor $Q_4$ more negative than its emitter during the interval that $Q_5$ is conducting. The emitter of transistor $Q_4$ is connected to the ground through the diode element 31, so that the emitter of $Q_4$ is more positive with respect to ground than the emitter of $Q_5$ by the amount of the voltage drop across the diode 31. With the "one-shot" in its stable state. $Q_5$ is saturated and the voltage drop across its emitter-collector path is extremely low and the collector is essentially at ground potential.

Each of negative pulses 22 is coupled to the base of transistor $Q_5$ through coupling capacitor 28 and instantaneously drives the base of the NPN transistor more negative than its emitter, reducing the collector current flow and causing the voltage at its collector to rise from ground to a more positive value. This positive-going voltage is coupled to the base of NPN transistor $Q_4$ through the feedback resistor 30, therefore initiating conduction in $Q_4$ causing the voltage at its collector to go more negative. This negative-going voltage at the collector of $Q_4$ is coupled to the base of $Q_5$ and further reduces the conductivity of this transistor causing the voltage at its collector to rise and driving $Q_4$ fully into the conducting state and producing at the output (the collector of $Q_5$) a positive-going pulse. The duration of this positive-going output pulse at the collector of $Q_5$ and the duration of the reversal of the conducting state of the transistors in the monostable multivibrator remain fixed for a period determined by the time-constant of capacitor 28 and resistor 29. That is, a fixed time after the conducting states have been reversed, a time fixed by the RC time constant of capacitor 28 and resistor 29, capacitor 28 has charged to a voltage such that the base of transistor $Q_5$ is now again more positive than its emitter, driving it into conduction and feeding a negative-going voltage to the base of transistor $Q_4$ to bias $Q_4$ into cut-off. The multivibrator thus returns to its stable state with $Q_5$ conducting and $Q_4$ cut off and remains in this state until the appearance of the next negative triggering pulse 22. When the multivibrator reverts to its original state, the positive-going pulse at the collector of $Q_5$ is terminated and the voltage at its collector drops to essentially ground potential and remains there until the conducting states are once again switched. The duty cycle of the pulse train, which may be defined as the duration of the positive pulse at the collector of $Q_5$ over the total pulse period is, therefore, a function of the repetition rate of the negative triggering pulses which, in turn, is determined by the frequency of the carrier input signal at terminal 1 as determined by the number zero crossings of this signal. It will also be apparent that the total energy of the pulse train is a function of the duty cycle and will vary as the frequency and triggering pulse rate changes.

The output pulse train from the collector of $Q_5$ is applied to an integrating circuit, not shown, to produce an output voltage which is proportional to the duty cycle of the pulse train and, hence, to the frequency of the carrier signal. One such integrating circuit which may be utilized is a low-pass filter having a cut-off frequency below the frequency $f_1$ and $f_2$ of the carrier wave and above the frequency of the keying rate. For example, assuming for the moment that digital data is to be transmitted by shifting the frequency of the carrier wave between the two frequencies $f_1$ (1200) and $f_2$ (2200), then if the cut-off frequency of the low-pass filter is made to be 900 cycles per second, the filter cannot pass either the frequencies $f_1$ and $f_2$ while yet passing a frequency component representing the data bit rate. The output pulse train. This energy is stored in the filter and produces at filter at a rate determined by the duty cycle of the pulse train. This energy is stored in the filter and produces at a unidirectional signal at the output of the filter the amplitude of which varies as a function of the duty cycle of the pulse train and, hence, of the frequency. Since the frequencies of the carrier wave vary between two discrete values $f_1$ and $f_2$, the D.C. output from the integrating low-pass filter circuit therefore varies discretely between two values representing the two frequencies at a rate determined by the keying rate. This output voltage may then be utilized directly as an indication of the intelligence abstracted from the carrier wave, or it may be further shaped and modified to reconstitute the original digital pulses representing the binary "1" and "0" conditions. It will be appreciated that the low-pass filter integrating network described here is merely one way of integrating the output of the zero crossing detector in order to poduce an output signal which varies as a function of the input frequency of the carrier wave. Obviously, other integrating circuits and mechanism are available and well known to those skilled in the art which will perform essentially the same function.

Such a zero crossing detector was constructed with the following component values:

$Q_1$—Silicon NPN TYPE 2N2925
$Q_2$-$Q_5$—Silicon NPN TYPE 2N2712
$R_4 = 10,000\Omega$
$R_5 = 5,100\Omega$
$R_7 = 3,000\Omega$
$R_8 = 1,000\Omega$
$R_{11} = 12,000\Omega$
$R_{12} = 51,000\Omega$
$R_{13} = 3,000\Omega$
$R_{17} = 100,000\Omega$
$R_{18} = 100,000\Omega$
$R_{21} = 3,000\Omega$
$R_{27} = 20,000\Omega$
$R_{29} = 38,300\Omega$
$R_{30} = 27,000\Omega$
$C_3 = 0.1\mu f$
$C_6 = 1.0\mu f$
$C_9 = 6.8\mu f$
$C_{19} = 270$ picofarads
$C_{20} = 270$ picofarads
$C_{28} = 4700$ picofarads
Diodes 15, 16, 31 are silicon diodes
$B+ = +12$ volts It will be apparent from the foregoing description that a novel detector of the zero-crossing type for a frequency-shift-keyed carrier wave has been disclosed, one which is simple of construction and effective in operation, and which does not utilize any inductor or transformer devices and which is, hence, eminently suitable for implementation in the form of integrated circuitry.

While a particular embodiment of this invention has been shown, it will, of course, be understood that the invention is not limited thereto, since many modifications, both in the circuit arrangements and in the instrumentalities employed may be made. It is contemplated by the appended claims to cover any such modifications as fall within the true spirit and scope of this invention.

What is claimed as new and desired to be secured by U.S. Letters Patent is:

1. In a frequency-shift-keyed data receiver, a zero-crossing detector for recovering the data from a received carrier wave that is frequency-shift-keyed at a selected rate, comprising:
   (a) a pulse-forming network having an input for a frequency-shifted carrier wave and first and second outputs for producing first and second out-of-phase pulse trains respectively, each train having a frequency determined by the zero crossings of said frequency-shifted carrier wave;
   (b) first and second differentiators coupled to said first and second outputs of said pulse-forming network for producing first and second differentiated signals from said first and second pulse trains respectively;
   (c) means coupled to said first and second differentiators for combining said first and second differentiated signals into a single signal;
   (d) a monostable multivibrator having an input coupled to said combining means and an output, said multivibrator having a stable state and a selected unstable state and being switched to said unstable state upon receipt of each differentiated signal in said single signal; and (e) integrating means coupled to said multivibrator output for producing an output signal having an amplitude determined by the ratio of said unstable state to said stable state of said multivibrator.

2. The zero-crossing detector according to claim 1 wherein said integrating means comprise a low-pass filter having a cut-off frequency below the frequencies of said frequency-shifted carrier wave, but having a cut-off frequency above the frequency of the keying rate of said frequency-shifted carrier wave.

3. The zero-crossing detector according to claim 1 wherein unidirectional conducting means are coupled between said pulse forming network and said first and second differentiators respectively.

4. The zero-crossing detector according to claim 3 wherein said unidirectional conducting means comprise diodes poled in the same manner so that pulses of only the same polarity are applied to said first and second differentiators.

5. The zero-crossing detector according to claim 1 wherein said integrating means comprise a low-pass filter having a cut-off frequency below the frequencies of said frequency-shifted carrier wave, but having a cut-of frequency above the frequency of the keying rate of said frequency-shifted carrier wave, and wherein unidirectional conducting means are coupled between said pulse-forming network and said first and second differentiators respectively.

6. The zero-crossing detector according to claim 5 wherein said unidirectional conducting means comprise diodes poled in the same manner so that pulses of only the same polarity are applied to said first and second differentiators.

References Cited
UNITED STATES PATENTS 3,412,205  11/1968  Saeger _____ 325—20 X JOHN KOMINSKI, Primary Examiner L. J. DAHL, Assistant Examiner

PO-1050
(5/69)

UNITED STATES PATENT OFFICE
CERTIFICATE OF CORRECTION

Patent No. 3,506,924          Dated April 14, 1970

Inventor(s) Robert P. Dixon

It is certified that error appears in the above-identified patent and that said Letters Patent are hereby corrected as shown below:

In the specification, please make the following changes:

Column 1, line 19 - Change "plus" to -- pulse -- .

Column 3, line 10 - Change "Q" to -- $Q_1$ -- ;

line 55 - Change "$Q_1$" to -- $Q_3$ -- .

Column 5, lines 66 and 67 - Change "The output pulse train. This energy is stored in the filter and produces at" to read:

-- The output pulse train from the multivibrator is supplying energy to the -- .

SIGNED AND
SEALED
SEP 15 1970

(SEAL)
Attest:

Edward M. Fletcher, Jr.
Attesting Officer

WILLIAM E. SCHUYLER, JR.
Commissioner of Patents